United States Patent
Chun et al.

(10) Patent No.: US 9,668,282 B2
(45) Date of Patent: *May 30, 2017

(54) METHOD OF CONTROLLING UPLINK SYNCHRONIZATION STATE AT A USER EQUIPMENT IN A MOBILE COMMUNICATION SYSTEM

(71) Applicant: LG Electronics Inc., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc.

( * ) Notice: Subject to any disclaimer, the term of this patent is extended or adjusted under 35 U.S.C. 154(b) by 153 days.

This patent is subject to a terminal disclaimer.

(21) Appl. No.: 14/304,515

(22) Filed: Jun. 13, 2014

(65) Prior Publication Data

US 2014/0293927 A1   Oct. 2, 2014

Related U.S. Application Data

(63) Continuation of application No. 13/657,679, filed on Oct. 22, 2012, now Pat. No. 8,812,009, which is a
(Continued)

(30) Foreign Application Priority Data

Jun. 17, 2008   (KR) .................. 10-2008-0057046

(51) Int. Cl.
*H04W 74/08* (2009.01)
*H04W 56/00* (2009.01)
*H04W 72/04* (2009.01)

(52) U.S. Cl.
CPC ... *H04W 74/0833* (2013.01); *H04W 56/0005* (2013.01); *H04W 72/0413* (2013.01)

(58) Field of Classification Search
CPC .................................................. H04W 74/0833
See application file for complete search history.

(56) References Cited

U.S. PATENT DOCUMENTS 5,754,754 A   5/1998   Dudley et al.
5,802,064 A   9/1998   Lieberman
(Continued)

FOREIGN PATENT DOCUMENTS

CN   1314747   9/2001
CN   1339903   3/2002
(Continued)

OTHER PUBLICATIONS

U.S. Appl. No. 12/672,835, Final Office Action dated May 9, 2013, 16 pages.
(Continued)

*Primary Examiner* — Hassan Kizou
*Assistant Examiner* — Abdullahi Ahmed
(74) *Attorney, Agent, or Firm* — Lee Hong Degerman Kang & Waimey (57) ABSTRACT

A method of controlling uplink synchronization state at a user equipment in a mobile communication system is disclosed. The method of controlling an uplink synchronization state at a user equipment in a mobile communication system comprises receiving control information associated with controlling uplink synchronization state of the user equipment from a network, releasing uplink resources allocated from the network if the uplink synchronization state is shifted from a synchronization state to an asynchronous state based on the control information.

11 Claims, 8 Drawing Sheets

Related U.S. Application Data continuation of application No. 12/665,324, filed as application No. PCT/KR2008/003462 on Jun. 18, 2008, now Pat. No. 8,315,641.

(60) Provisional application No. 60/944,785, filed on Jun. 18, 2007, provisional application No. 60/945,340, filed on Jun. 20, 2007.

(56) References Cited

U.S. PATENT DOCUMENTS

| | | |
|---|---|---|
| 5,878,041 A | 3/1999 | Yamanaka et al. |
| 6,445,917 B1 | 9/2002 | Bark et al. |
| 6,557,135 B1 | 4/2003 | Balachandran et al. |
| 6,594,240 B1 | 7/2003 | Chuah et al. |
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,738,624 B1 | 5/2004 | Aksentijevic et al. |
| 6,788,944 B2 | 9/2004 | Jiang |
| 6,862,450 B2 | 3/2005 | Mikola et al. |
| 6,874,113 B2 | 3/2005 | Chao et al. |
| 6,967,936 B1 | 11/2005 | Laroia et al. |
| 6,987,985 B2 | 1/2006 | Purkayastha et al. |
| 7,009,940 B2 | 3/2006 | Vialen et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,796,505 B2 | 9/2010 | Olsson et al. |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,321 B2 | 9/2011 | Zheng |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,361 B2 | 9/2012 | Yi et al. |
| 8,335,189 B2 | 12/2012 | Wang et al. |
| 8,699,711 B2 | 4/2014 | Mukherjee et al. |
| 8,712,055 B2 | 4/2014 | Yi et al. |
| 8,797,956 B2 | 8/2014 | Hapsari et al. |
| 8,812,009 B2 * | 8/2014 | Chun ............... H04W 56/0005 455/450 |
| 8,989,382 B2 | 3/2015 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0003106 A1 | 1/2004 | Cunningham et al. |
| 2004/0008659 A1 | 1/2004 | Kim |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0229626 A1 | 11/2004 | Yi et al. |
| 2004/0235447 A1 | 11/2004 | Gronberg et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen et al. |
| 2005/0083943 A1 | 4/2005 | Lee et al. |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0195852 A1 | 9/2005 | Vayanos et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237972 A1 | 10/2005 | Van Dervelde et al. |
| 2005/0238051 A1 | 10/2005 | Yi et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2006/0281456 A1 | 12/2006 | Roberts et al. |
| 2007/0041397 A1 | 2/2007 | Hwang |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0133456 A1 | 6/2007 | Ding |
| 2007/0177628 A1 | 8/2007 | Choi et al. |
| 2007/0183358 A1 | 8/2007 | Cai |
| 2007/0189205 A1 | 8/2007 | Terry et al. |
| 2007/0201397 A1 | 8/2007 | Zhang |

(56) References Cited

U.S. PATENT DOCUMENTS

| | | | |
|---|---|---|---|
| 2007/0206530 A1 | 9/2007 | Lee et al. | |
| 2007/0206531 A1* | 9/2007 | Pajukoski | H04W 74/0866 370/329 |
| 2007/0223526 A1 | 9/2007 | Jiang | |
| 2007/0258591 A1 | 11/2007 | Terry et al. | |
| 2007/0268861 A1 | 11/2007 | Diachina et al. | |
| 2007/0274278 A1 | 11/2007 | Choi et al. | |
| 2007/0287440 A1 | 12/2007 | Benkert et al. | |
| 2007/0297360 A1 | 12/2007 | Joachim et al. | |
| 2007/0297367 A1 | 12/2007 | Wang et al. | |
| 2008/0002688 A1 | 1/2008 | Kim et al. | |
| 2008/0008152 A1 | 1/2008 | Lohr et al. | |
| 2008/0013521 A1 | 1/2008 | Rangan et al. | |
| 2008/0043658 A1 | 2/2008 | Worrall | |
| 2008/0043670 A1 | 2/2008 | Marinier | |
| 2008/0045224 A1 | 2/2008 | Lu et al. | |
| 2008/0045272 A1 | 2/2008 | Wang et al. | |
| 2008/0051098 A1 | 2/2008 | Rao | |
| 2008/0059859 A1 | 3/2008 | Marinier et al. | |
| 2008/0069108 A1 | 3/2008 | Yi et al. | |
| 2008/0081598 A1 | 4/2008 | Chandra et al. | |
| 2008/0084851 A1 | 4/2008 | Kim et al. | |
| 2008/0089285 A1 | 4/2008 | Pirskanen et al. | |
| 2008/0101609 A1 | 5/2008 | Jiang | |
| 2008/0146242 A1 | 6/2008 | Alanara et al. | |
| 2008/0165717 A1 | 7/2008 | Chen et al. | |
| 2008/0165755 A1 | 7/2008 | Marinier et al. | |
| 2008/0182609 A1 | 7/2008 | Somasundaram et al. | |
| 2008/0186936 A1 | 8/2008 | Chun et al. | |
| 2008/0186944 A1 | 8/2008 | Suzuki et al. | |
| 2008/0186946 A1 | 8/2008 | Marinier et al. | |
| 2008/0198869 A1 | 8/2008 | Jiang | |
| 2008/0212561 A1 | 9/2008 | Pani et al. | |
| 2008/0232396 A1 | 9/2008 | Buckley et al. | |
| 2008/0233940 A1 | 9/2008 | Jen | |
| 2008/0233941 A1 | 9/2008 | Jen | |
| 2008/0268878 A1 | 10/2008 | Wang et al. | |
| 2008/0273482 A1 | 11/2008 | Lee et al. | |
| 2008/0273610 A1 | 11/2008 | Malladi et al. | |
| 2008/0318578 A1 | 12/2008 | Worrall | |
| 2009/0005058 A1 | 1/2009 | Kazmi et al. | |
| 2009/0016301 A1 | 1/2009 | Sammour et al. | |
| 2009/0046617 A1 | 2/2009 | Tenny et al. | |
| 2009/0046631 A1 | 2/2009 | Meylan et al. | |
| 2009/0046695 A1 | 2/2009 | Jiang | |
| 2009/0104890 A1 | 4/2009 | Wang et al. | |
| 2009/0116434 A1 | 5/2009 | Lohr et al. | |
| 2009/0156194 A1 | 6/2009 | Meylan | |
| 2009/0175163 A1 | 7/2009 | Sammour et al. | |
| 2009/0232076 A1 | 9/2009 | Kuo | |
| 2009/0259908 A1 | 10/2009 | Gollapudi | |
| 2009/0318177 A1 | 12/2009 | Wang et al. | |
| 2009/0323574 A1 | 12/2009 | Koskinen et al. | |
| 2010/0014466 A1 | 1/2010 | Meyer et al. | |
| 2010/0091750 A1 | 4/2010 | Lee et al. | |
| 2010/0128648 A1 | 5/2010 | Lee et al. | |
| 2010/0142429 A1 | 6/2010 | Yi et al. | |
| 2010/0142457 A1 | 6/2010 | Chun et al. | |
| 2010/0157904 A1 | 6/2010 | Ho et al. | |
| 2010/0172282 A1 | 7/2010 | Zhang et al. | |
| 2010/0232335 A1 | 9/2010 | Lee et al. | |
| 2010/0290427 A1* | 11/2010 | Sebire | H04W 36/0055 370/331 |
| 2011/0019604 A1 | 1/2011 | Chun et al. | |
| 2011/0033048 A1 | 2/2011 | Stanwood et al. | |
| 2011/0305182 A1 | 12/2011 | Suzuki et al. | |
| 2013/0258919 A1 | 10/2013 | Damnjanovic | |

FOREIGN PATENT DOCUMENTS

| | | |
|---|---|---|
| CN | 1349360 | 5/2002 |
| CN | 1390425 | 1/2003 |
| CN | 1396780 | 2/2003 |
| CN | 1457202 | 11/2003 |
| CN | 1613210 | 5/2005 |
| CN | 1642067 | 7/2005 |
| CN | 1643820 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 1997227 | 7/2007 |
| EP | 1035745 | 9/2000 |
| EP | 1263160 | 12/2002 |
| EP | 1326397 | 7/2003 |
| EP | 1343267 | 9/2003 |
| EP | 1458148 | 9/2004 |
| EP | 1508992 | 2/2005 |
| EP | 1509011 | 2/2005 |
| EP | 1557967 | 7/2005 |
| EP | 1578111 | 9/2005 |
| EP | 1638237 | 3/2006 |
| EP | 1655879 | 5/2006 |
| EP | 1689130 | 8/2006 |
| EP | 1746855 | 1/2007 |
| EP | 1768297 | 3/2007 |
| EP | 1788751 | 5/2007 |
| EP | 1796405 | 6/2007 |
| EP | 2026523 | 2/2009 |
| JP | 06-053921 | 2/1994 |
| JP | 07162948 | 6/1995 |
| JP | 2000324161 | 11/2000 |
| JP | 2001197021 | 7/2001 |
| JP | 2002198895 | 7/2002 |
| JP | 2003018050 | 1/2003 |
| JP | 2003-115796 | 4/2003 |
| JP | 2003115876 | 4/2003 |
| JP | 2003229925 | 8/2003 |
| JP | 2003283592 | 10/2003 |
| JP | 2005073276 | 3/2005 |
| JP | 2006054718 | 2/2006 |
| JP | 2006505209 | 2/2006 |
| JP | 2006514466 | 4/2006 |
| JP | 2006121562 | 5/2006 |
| JP | 2006311543 | 11/2006 |
| JP | 2007116639 | 5/2007 |
| JP | 2007312244 | 11/2007 |
| JP | 2008520125 | 6/2008 |
| JP | 2009521893 | 6/2009 |
| JP | 2010-518683 | 5/2010 |
| KR | 1020010045783 | 6/2001 |
| KR | 1020010062306 | 7/2001 |
| KR | 1020020004645 | 1/2002 |
| KR | 1020020097304 | 12/2002 |
| KR | 1020030012048 | 2/2003 |
| KR | 1020030060055 | 7/2003 |
| KR | 1020030068743 | 8/2003 |
| KR | 10-2004-0016065 | 2/2004 |
| KR | 10-2004-0016334 | 2/2004 |
| KR | 1020040034398 | 4/2004 |
| KR | 1020040039944 | 5/2004 |
| KR | 1020040072961 | 8/2004 |
| KR | 10-2005-0029395 | 3/2005 |
| KR | 1020050022988 | 3/2005 |
| KR | 1020050062359 | 6/2005 |
| KR | 1020050081836 | 8/2005 |
| KR | 1020050092874 | 9/2005 |
| KR | 1020050099472 | 10/2005 |
| KR | 1020050100882 | 10/2005 |
| KR | 1020060004935 | 1/2006 |
| KR | 1020060014910 | 2/2006 |
| KR | 10-2006-0029452 | 4/2006 |
| KR | 10-0566795 | 4/2006 |
| KR | 1020060042858 | 5/2006 |
| KR | 1020060069378 | 6/2006 |
| KR | 1020060079784 | 7/2006 |
| KR | 1020060090191 | 8/2006 |
| KR | 10-2006-0131671 | 12/2006 |
| KR | 1020060134058 | 12/2006 |

(56) References Cited

FOREIGN PATENT DOCUMENTS

| | | |
|---|---|---|
| KR | 10-0677131 | 2/2007 |
| KR | 1020070048552 | 5/2007 |
| KR | 10-2007-0073577 | 7/2007 |
| KR | 10-2007-0073588 | 7/2007 |
| KR | 10-2007-0076374 | 7/2007 |
| KR | 10-2008-0085694 | 9/2008 |
| KR | 10-0907978 | 7/2009 |
| KR | 10-2009-0084756 | 8/2009 |
| KR | 1020090084320 | 8/2009 |
| RU | 2304348 | 8/2007 |
| TW | 496058 | 7/2002 |
| WO | 9937114 | 7/1999 |
| WO | 0122645 | 3/2001 |
| WO | 01/24411 | 4/2001 |
| WO | 01/37473 | 5/2001 |
| WO | 01/39386 | 5/2001 |
| WO | 01/67664 | 9/2001 |
| WO | 02/01742 | 1/2002 |
| WO | 02/45453 | 6/2002 |
| WO | 03045103 | 5/2003 |
| WO | 2004/042953 | 5/2004 |
| WO | 2004042963 | 5/2004 |
| WO | 2004042964 | 5/2004 |
| WO | 2004/100537 | 11/2004 |
| WO | 2004/102838 | 11/2004 |
| WO | 2005/022814 | 3/2005 |
| WO | 2005039108 | 4/2005 |
| WO | 2005/078967 | 8/2005 |
| WO | 2005/079105 | 8/2005 |
| WO | 2005/109671 | 11/2005 |
| WO | 2005122441 | 12/2005 |
| WO | 2005125226 | 12/2005 |
| WO | 2006/009714 | 1/2006 |
| WO | 2006/016785 | 2/2006 |
| WO | 2006/033521 | 3/2006 |
| WO | 2006046894 | 5/2006 |
| WO | 2006052086 | 5/2006 |
| WO | 2006/075820 | 7/2006 |
| WO | 2006/083149 | 8/2006 |
| WO | 2006095385 | 9/2006 |
| WO | 2006/104335 | 10/2006 |
| WO | 2006/104342 | 10/2006 |
| WO | 2006/104773 | 10/2006 |
| WO | 2006/116620 | 11/2006 |
| WO | 2006/118435 | 11/2006 |
| WO | 2006118418 | 11/2006 |
| WO | 2007/020070 | 2/2007 |
| WO | 2007/023364 | 3/2007 |
| WO | 2007024065 | 3/2007 |
| WO | 2007/045505 | 4/2007 |
| WO | 2007039023 | 4/2007 |
| WO | 2007/052921 | 5/2007 |
| WO | 2007052900 | 5/2007 |
| WO | 2007066900 | 6/2007 |
| WO | 2007/078155 | 7/2007 |
| WO | 2007/078174 | 7/2007 |
| WO | 2007/079085 | 7/2007 |
| WO | 2007078142 | 7/2007 |
| WO | 2007078156 | 7/2007 |
| WO | 2007078164 | 7/2007 |
| WO | 2007078173 | 7/2007 |
| WO | 2007078174 | 7/2007 |
| WO | 2007/091831 | 8/2007 |
| WO | 2007089797 | 8/2007 |
| WO | 2007091838 | 8/2007 |
| WO | 2007126793 | 11/2007 |
| WO | 2007147431 | 12/2007 |
| WO | 2008/004725 | 1/2008 |
| WO | 2008/010063 | 1/2008 |
| WO | 2008/060097 | 5/2008 |
| WO | 2008/094120 | 8/2008 |
| WO | 2009/035301 | 3/2009 |

OTHER PUBLICATIONS

Qualcomm Europe, "General Corrections to RLC," 3GPP TSG-RAN Working Group 2 #22, Tdoc R2-011701, Jul. 2001, 6 pages.
LG Electronics Inc., "Out-of-sequence problem in AM RLC: Discretely discarded SDUs," 3GPP TSG-RAN WG2 Meeting #21, R2-011206, May 2001, 2 pages.
Korean Intellectual Property Office Application Serial No. 10-2008-0091287, Notice of Allowance dated Apr. 24, 2014, 3 pages.
U.S. Appl. No. 13/541,574 Office Action dated Oct. 23, 2013, 6 pages.
Intellectual Property Office of India Application Serial No. 4312/KOLNP/2009, Office Action dated Oct. 29, 2014, 2 pages.
Intellectual Property Office of India Application Serial No. 4404/KOLNP/2009, Office Action dated Oct. 20, 2014, 1 page.
"Universal Mobile Telecommunications System (UMTS); Radio Link Control (RLC) protocol specification (3GPP TS 25.322 version 4.10.0 Release 4)", ETSI TS 125 322, Sep. 2003, XP-014016803.
LG Electronics Inc, "Correction to Polling Procedure", R2-081588, 3GPP TSG-RAN WG2 #61bis, Mar. 2008, XP-050139320.
Cohen, "An Improved SSCOP-like Scheme for Avoiding Unnecessary Retransmissions and Achieving Ideal Throughput," Proceedings of IEEE INFOCOM Conference on Computer Communications, pp. 855-862, Mar. 1996, XP-010158150.
Mukherjee, R.P. "Method and Apparatus of Performing Packet Data Convergence Protocol Reset," U.S. Appl. No. 61/019,058, filed Jan. 4, 2008.
ZTE, "Redundant Retransmission Restraint in RLC-AM," 3GPP TSG-RAN WG2 Meeting #53, R2-061234, May 8, 2006, XP-050131180.
European Telecommunication Standards Institute (ETSI), "Digital Cellular Telecommunications System (Phase 2+), Functional Stage 2 Description of Location Services (LCS) in GERAN," ETSI Technical Specification, ETSI TS 143 059, V7.3.0, May 2007, XP-014038519.
Texas Instruments, "UL Synchronization Management in LTE_Active," R1-071478, 3GPP TSG RAN WG1 #48bis, Mar. 2007, XP-050105413.
Texas Instruments, "UL Synchronization Management and Maintenance in E-UTRA," R1-072198, 3GPP TSG RAN WG1 #49, May 2007, XP-050105936.
LG Electronics Inc., "UE State Transition in LTE_Active," R2-061002, 3GPP TSG RAN WG2 #52, Mar. 2006, XP-050130928.
Ericsson, "Scheduling Request in E-UTRAN," R1-070471, 3GPP TSG RAN WG2 #47bis, Jan. 2007, XP-050104502.
Motorola, "Contention-Free Intra-LTE Handover," R2-070730, 3GPP TSG RAN WG2 #57, Feb. 2007, XP-050133763.
Nokia, "Buffer Reporting for E-UTRAN," R2-060829, 3GPP TSG-RAN WG2 Meeting #52, Mar. 2006, XP-002503218.
Nokia, "Uplink Scheduling for VoIP," R2-070476, 3GPP TSG-RAN WG2 Meeting #57, Feb. 2007, XP-008125208.
U.S. Appl. No. 13/431,795, Office Action dated Oct. 4, 2013, 11 pages.
U.S. Appl. No. 12/452,733, Final Office Action dated Jan. 8, 2013, 19 pages.
NTT DoCoMo, Inc., "RA response format," 3GPP TSG RAN WG2 #60bis, R2-080451, Jan. 2008, 2 pages.
European Patent Office Application Serial No. 14177928.0, Search Report dated Sep. 29, 2014, 8 pages.
LG Electronics, "Resource request in Synchronized Case," TSG-RAN Working Group 2 #52, R2-061018, Mar. 2005, 2 pages.
LG Electronics, "Discussion on Message 4 in Random Access," 3GPP TSG-RAN WG2 #59, R2-073354, Aug. 2007, 4 pages.
Panasonic, "Random access design for E-UTRA uplink," TSG-RAN WG1 Meeting#45, R1-061114, May 2006, 5 pages.
NTT DoCoMo, "Random Access Channel Structure for E-UTRA Uplink," 3GPP TSG-RAN WG1 and WG2 Joint Meeting, R2-061064, Mar. 2006, 8 pages.
Samsung, "Optimization of contention resolution in RACH," 3GPP TSG-RAN WG2#58bis, R2-072797, Jun. 2007, 3 pages.
Motorola, et al., "E-UTRA Random Access Channel TP from email discussion," 3GPP TSG RAN1#44-bis, R1-060885, Mar. 2006, 6 pages.

(56) References Cited

OTHER PUBLICATIONS

Nec, et al., "Need for MAC contention-resolution for non-initial access," 3GPP TSG-RAN WG2 Meeting #59, R2-073092, Aug. 2007, 3 pages.
Ericsson, "Text proposal on scheduling request triggering criterions for LTE," 3GPP TSG-RAN WG2 #59, Tdoc R2-073210, 2 pages.
U.S. Appl. No. 12/733,179, Notice of Allowance dated Mar. 21, 2014, 6 pages.
LG Electronics Inc., "Handling of HFN de-synchronization," 3GPP TSG-RAN WG2 #60, R2-074746, Nov. 2007, 2 pages.
European Patent Office Application Serial No. 08793028.5, Search Report dated Mar. 12, 2014, 7 pages.
U.S. Appl. No. 12/672,835, Office Action dated Sep. 11, 2013, 16 pages.
U.S. Appl. No. 12/671,020, Notice of Allowance dated Feb. 14, 2013, 11 pages.
The State Intellectual Property Office of the People's Republic of China Application Serial No. 200980100119.3 Office Action dated Feb. 5, 2013, 14 pages.
U.S. Appl. No. 14/295,207, Notice of Allowance Jun. 12, 2015, 10 pages.
Nokia Siemens Networks, "Security Update," 3GPP TSG-RAN2 Meeting #59bis, R2-074526, XP050137055, Oct. 2007, 4 pages.
LG Electronics Inc., "Security de-synchronization," 3GPP TSG-RAN WG2 #59, R2-073258, XP050135984, Aug. 2007, 2 pages.
European Patent Office Application Serial No. 08844213.2, Search Report dated Jun. 23, 2015, 6 pages.
Motorola, "LTE Random Access Procedure", R2-061463, 3GPP TSG-RAN WG2#53, XP007905045, May 2006, 4 pages.
Ericsson, "Random Access Procedures for LTE", Tdoc R2-060866, Joint RAN1/RAN2 meeting on LTE, Mar. 2006, 7 pages.
MAC Rapporteurs, "Text Proposal for MAC agreements", R2-074531, 3GPP TSG-RAN WG2 #59bis, Aug. 2007, 9 pages.
European Patent Office Application Serial No. 08841080.8, Search Report dated Feb. 14, 2014, 14 pages.
Nokia Corporation, et al., "MAC Header Format", R2-073891, 3GPP TSG-RAN WG2 Meeting #59bis, XP-002602993, Oct. 2007, 5 pages.
European Patent Office Application Serial No. 08842001.3, Search Report dated Feb. 21, 2014, 10 pages.
3rd Generation Partnership Project (3GPP), "3rd Generation Partnership Project; Technical Specification Group Radio Access Network; Radio Link Control (RLC) protocol specification (Release 6)," 3GPP TS 25.322 V6.5.0, Sep. 2005, XP050129441, 79 pages (relevant portions: paragraphs [9.7.1], [11.3.2] and [11.3.2.1.1]).
Zhang, et al., "Performance of UMTS Radio Link Control," Proceedings of IEEE International Conference on Communications, XP010590089, Apr. 2002, 5 pages.
European Patent Office Application Serial No. 08164559.0, Search Report dated Jun. 27, 2013, 8 pages.
3rd Generation Partnership Project (3GPP), "3rd Generation Partnership Project; Technical Specification Group Radio Access Network; Radio Link Control (RLC) protocol specification (Release 7)," 3GPP TS 25.322 V7.3.0, Jun. 2007, XP05367795, 81 pages (relevant portions: sections [4.2.1], [9.5], [9.7.3] and [11.6]).
European Patent Office Application Serial No. 08164607.7, Search Report dated Jul. 12, 2013, 8 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.
ASUSTeK, "Minor corrections to 36.321," 3GPP TSG-RAN WG2 Meeting #67, R2-095152, Aug. 2009, 6 pages.
U.S. Appl. No. 12/733,179, Final Office Action dated Apr. 18, 2013, 21 pages.
Alcatel-Lucent, "Format for RACH Message 2", R2-080176, 3GPP TSG RAN WG2 #60bis, Jan. 2008.
Motorola, "Design of backoff scheme for LTE", R2-070143, 3GPP TSG-RAN-WG2 Meeting #56bis, Jan. 2007.
MAC Rapporteurs (Ericsson, Qualcomm Europe), "E-UTRA MAC protocol specification update", R2-080631, 3GPP TSG-RAN2 Meeting #60bis, Jan. 2008.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
Motorola, "MAC Header format", R2-074419, 3GPP TSG-RAN2 Meeting #59bis, Oct. 2007.
NTT DoCoMo, Inc. et al, "MAC PDU structure for LTE", R2-074174, 3GPP TSG RAN WG2 #59bis, Oct. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
"LTE User Plane session report", R2-074536, 3GPP TSG RAN WG2 #59bis, Oct. 2008.
Rapporteur (ASUSTeK), "Summary of HFN de-synchronization problem off-line email discussion", R2-050318, 3GPP TSG RAN WG2 #46, Feb. 2005.
ASUSTeK, "On-line recovery of HFN synchronization due to RLC UM SN problem", R2-041940, 3GPP TSG-RAN WG2 meeting #44, Oct. 2004.
Motorola, "Synchronized Random Access Channel and Scheduling Request," R1-063046, 3GPP TSG RAN1#47, Nov. 2006.
NTT DoCoMo et al., "Scheduling Request Transmission Method for E-UTRA Uplink," R1-063301, 3GPP TSG RAN WG1 Meeting #47, Nov. 2006.
Ericsson, "Basic Principles for the Scheduling Request in LTE," R2-062350, 3GPP TSG RAN WG2 #54, Aug. 2006.
Ericsson et al., "Framework for Scheduling Request and Buffer Status Reporting," R2-074691, TSG-RAN WG2 Meeting #60, Nov. 2007.
Itri, "Buffer Status Reporting with Group Combining for LTE", R2-072833, 3GPP TSG-RAN-WG2 Meeting #58bis, Jun. 2007.
Nec, "Considerations on Scheduling Information", R2-073556, 3GPP TSG-RAN WG2#59, Aug. 2007.
Ghosh, A., et al.; "Random Access Design for UMTS Air-Interface Evolution"; 65th IEEE; Vehicular Technology Conference, 2007; pp. 1041-1045; Apr. 2007.
Nokia; "System Information Distribution"; 3GPP TSG-RAN WG2 Ad Hoc Meeting on LTE; Cannes, France; Jun. 2006; R2-061487.
LG Electronics; "Delivery of LTE System Information"; 3GPP TSG-RAN WG2 ad-hoc on LTE; Cannes, France; Jun. 2006; R2-061959.
Abeta Sadayuki, et al.; "Super 3G Technology Trends part 2: Research on Super 3G Technology"; NTT DoCoMo Tech Journal; Dec. 2006; pp. 55-62; vol. 8; No. 3.
3rd Generation Partnership Project (3GPP); "Technical Specification Group Radio Access Network; Evolved Universal Terrestrial Radio Access (E-UTRA) Radio Link Control (RLC) protocol specification (Release 8)", 3GPP TS 36.322 V8.0.0, Dec. 2007.
"Miscellaneous corrections to TS 36.322", R2-081700, 3GPP TSG-RAN2 Meeting #61bis, Mar. 2008.
Ericsson, "Clarification to the handling of large RLC status reports", R2-082018, 3GPP TSG-RAN2 Meeting #61bis, Mar. 2008.
LG Electronics Inc. et al., "ACK_SN setting for short Status PDU", R2-082133, 3GPP TSG-RAN WG2 #62, May 2008.
QUALCOMM Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Nokia Siemens Networks, "Update on Security, System Information, Mobility, MBMS and DRX", R2-073863, 3GPP TSG-RAN2 Meeting #59, Aug. 2007.
Ericsson, "SDU Discard", R2-073230, 3GPP TSG-RAN WG2 #59, Aug. 2007.
Catt, Ritt; "Consideration on UL Buffer Reporting"; 3GPP TSG RAN WG2#55; Seoul, Korea; Oct. 2006; R2-062934; XP-002513924.
Nec; "Optimized Buffer Status Reporting" 3GPP TSG-RAN WG2# 58bis Meeting; Orlando, USA; Jun. 2007; Tdoc R2-072515.

(56) References Cited

OTHER PUBLICATIONS

U.S. Appl. No. 14/203,287, Office Action dated Oct. 24, 2014, 6 pages.
Intellectual Property Office of India Application Serial No. 4562/KOLNP/2009, Office Action dated Nov. 7, 2014, 2 pages.
U.S. Appl. No. 12/672,835, Final Office Action dated Dec. 19, 2013, 18 pages.
NTT DoCoMo, Inc., "Uplink Synchronization," 3GPP TSG RAN WG2 #57, R2-070781, XP-002713200, Feb. 2007, 3 pages.
Samsung, "MAC functions: ARQ," 3GPP TSG-RAN2 Meeting #51, Tdoc R2-060374, XP-002488423, Feb. 2006, 5 pages.
European Patent Office Application Serial No. 08793118.4, Search Report dated Dec. 10, 2013, 6 pages.
Nokia, "System Information Change Indication", R2-071739, 3GPP TSG-RAN WG2 Meeting #57bis, May 2007, 4 pages.
European Patent Office Application Serial No. 08766382.9, Search Report dated Dec. 13, 2013, 7 pages.
European Patent Office Application Serial No. 08832469.4, Search Report dated Dec. 20, 2013, 5 pages.
European Patent Office Application Serial No. 08766415.7 Search Report dated Jan. 2, 2014, 8 pages.
U.S. Appl. No. 13/107,232, Notice of Allowance dated Jan. 30, 2013, 15 pages.
U.S. Appl. No. 12/452,905, Final Office Action dated Apr. 11, 2013, 20 pages.
U.S. Appl. No. 12/602,763, Office Action dated Jan. 5, 2015, 8 pages.
Korean Intellectual Property Office Application Serial No. 10-2008-0076181, Notice of Allowance dated Feb. 11, 2015, 2 pages.
U.S. Appl. No. 14/585,710, Office Action dated Apr. 23, 2015, 6 pages.
Korean Intellectual Property Office Application Serial No. 10-2008-0077366, Notice of Allowance dated Nov. 24, 2014, 2 pages.
Intellectual Property Office of India Application Serial No. 4360/KOLNP/2009, Office Action dated Oct. 22, 2014, 2 pages.
U.S. Appl. No. 12/234,574, Office Action dated Aug. 14, 2013, 18 pages.
QUALCOMM Europe, "L2 improvements and polling," 3GPP TSG-RAN WG2 #58, R2-072021, May 2007, 3 pages.
LG Electronics, "Overall control signaling structure for generic LTE TDD," 3GPP TSG RAN WG1 LTE TDD Ad Hoc, R1-071848, Apr. 2007, 4 pages.
Siemens, "Signaling in DL for uplink resource allocation," 3GPP TSG RAN WG1#45, R1-061290, May 2006, 6 pages.
European Patent Office Application Serial No. 08793155.6, Search Report dated Jan. 8, 2014, 10 pages.
LG Electronics, "Update of eUtran PDCP specification", R2-081390, 3GPP TSG-RAN2 Meeting #61, Jan. 2008.
Kashima, T.; "Method and Apparatus for Providing Timing Alignment"; U.S. Appl. No. 60/944,662, filed Jun. 18, 2007.
Lin, L.C.; "Enhanced random access response formats in E-UTRA"; U.S. Appl. No. 61/006,348, filed Jan. 8, 2008.
Ericsson, "RLC status report format", R2-074701, TSG-RAN WG2 Meeting #60, Nov. 2007.
QUALCOMM Europe, "UL requests", R1-070426, 3GPP TSG-RAN WG1 #47bis, Jan. 2007.
ASUSTeK Computer Inc., "HFN de-synchronization detection with Integrity Protection scheme in a wireless communications system", U.S. Appl. No. 60/863,800, filed Oct. 31, 2006.
LG Electronics Inc., "Correction of status report coding," R2-080969, 3GPP TSG RAN WG2 #61, Feb. 2008, XP-002624626.

LG Electronics, "Correction to PDCP Status Report," R2-081594, 3GPP TSG-RAN2 Meeting #61bis, Mar. 2008, XP-002624627.
Alcatel-Lucent, "PDCP status report carrying LIS only," R2-080902, 3GPP TSG RAN WG2 #61, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323 V8.2.1, May 2008, XP-050377638.
Qualcomm Europe, "Further Details on RACH Procedure," R1-070649, 3GPP TSG-RAN WG1 #48, Feb. 2007.
NTT DoCoMo, Inc., "Buffer Status Report and Scheduling Request triggers," R2-073574, 3GPP TSG RAN WG2 #59, Aug. 2007.
Wang, P.S., "Operation of Control Protocol Data Units in Packet Data Convergence Protocol," U.S. Appl. No. 60/976,139, filed Sep. 28, 2007.
U.S. Appl. No. 13/441,698, Office Action dated Nov. 21, 2012, 9 pages.
NTT DoCoMo, Inc., "Uplink synchronization maintenance", R2-072014, 3GPP TSG RAN WG2 #58, May 2007, 4 pages, XP50134889.
European Patent Office Application Serial No. 08766423.1, Office Action dated Nov. 5, 2012, 5 pages.
U.S. Appl. No. 13/431,795, Notice of Allowance dated Jul. 1, 2014, 7 pages.
U.S. Appl. No. 12/602,763, Office Action dated Aug. 4, 2014, 10 pages.
The State Intellectual Property Office of the People's Republic of China Application Serial No. 201210332593.2, Office Action dated Sep. 3, 2014, 6 pages.
Universal Mobile Telecommunications System (UMTS), "Radio Resource Control (RRC) protocol specification (3GPP TS 25.331 version 6.6.0 Release 6)," ETSI TS 125 331 V6.6.0, Jun. 2005, 1157 pages.
European Patent Office Application Serial No. 09151792.0, Search Report dated Nov. 7, 2013 8 pages.
Korean Intellectual Property Office Application Serial No. 10-2007-0082382, Notice of Allowance dated Nov. 1, 2013, 2 pages.
U.S. Appl. No. 12/672,999, Final Office Action dated Jun. 6, 2013, 12 pages.
Masson, "E-UTRA RACH within the LTE system," XP-002448009, Feb. 2006, 82 pages (relevant pp. 60 and 61).
LG Electronics Inc., "RACH procedure," 3GPP TSG-RAN WG2 #59, R2-073043, XP-002515770, Aug. 2007, 3 pages.
LG Electronics Inc., "Discussion on random access back-off procedure," 3GPP TSG-RAN WG2 #60bis, R2-080189, Jan. 2008, 5 pages.
3rd Generation Partnership Project (3GPP), Technical Specification Group Radio Access Network; Evolved Universal Terrestrial Radio Access (E-UTRA) Medium Access Control (MAC) protocol specification (Release 8), 3GPP TS 36.321 V8.0.0, XP-002520880, Dec. 2007, 23 pages.
European Patent Office Application Serial No. 09151778.9, Search Report dated Jun. 11, 2013, 8 pages.
Catt, "Notification scheme for system information Change", R2-071870, 3GPP TSG-RAN WG2#58, May 2007, 5 pages.
LG Electronics Inc., "Discussion on BCCH Update", R2-072736, 3GPP TSG-RAN WG2 #58bis, Jun. 2007, 3 pages.
European Patent Office Application Serial No. 08011263.4, Search Report dated Dec. 7, 2012, 8 pages.
European Patent Office Application Serial No. 14189433.7, Search Report dated Feb. 16, 2016, 5 pages.

* cited by examiner

METHOD OF CONTROLLING UPLINK SYNCHRONIZATION STATE AT A USER EQUIPMENT IN A MOBILE COMMUNICATION SYSTEM

CROSS-REFERENCE TO RELATED APPLICATIONS

This application is a continuation of U.S. patent application Ser. No. 13/657,679, filed on Oct. 22, 2012, now U.S. Pat. No. 8,812,009, which is a continuation of U.S. patent application Ser. No. 12/665,324, filed on Dec. 17, 2009, now U.S. Pat. No. 8,315,641, which is the National Stage filing under 35. U.S.C. §371. of International Application No. PCT/KR2008/003462, filed on Jun. 18, 2008, which claims the benefit of earlier filing date and right of priority to Korean Application No. 10-2008-0057046, filed on Jun. 17, 2008, and also claims the benefit of U.S. Provisional Application Ser. Nos. 60/944,785, filed on Jun. 18, 2007, and 60/945,340, filed on Jun. 20, 2007, the contents of which are all incorporated by reference herein in their entirety.

TECHNICAL FIELD

The present invention relates to a mobile communication system, and more particularly, to a method of controlling uplink synchronization state at a user equipment in a mobile communication system.

BACKGROUND ART

In a mobile communication system which uses multiple carriers, such as an orthogonal frequency division multiple access (OFDMA) or a single carrier-frequency division multiple access (SC-FDMA), radio resources are a set of continuous sub-carriers and are defined by a time-frequency region on a two-dimensional sphere. A time-frequency region in the OFDM or OFDMA scheme is a rectangular form sectioned by time and sub-carrier coordinates. In other words, one time-frequency region could be a rectangular form sectioned by at least one symbol on a time axis and a plurality of sub-carriers on a frequency axis. Such a time-frequency region can be allocated to an uplink for a specific user equipment (UE), or a base station can transmit the time-frequency region to a specific user equipment in a downlink. In order to define such a time-frequency region on the two-dimensional sphere, the number of OFDM symbols on the time region and the number of continuous sub-carriers on the frequency region should be given, wherein the continuous sub-carriers start from a point having an offset from a reference point.

Figure 1:
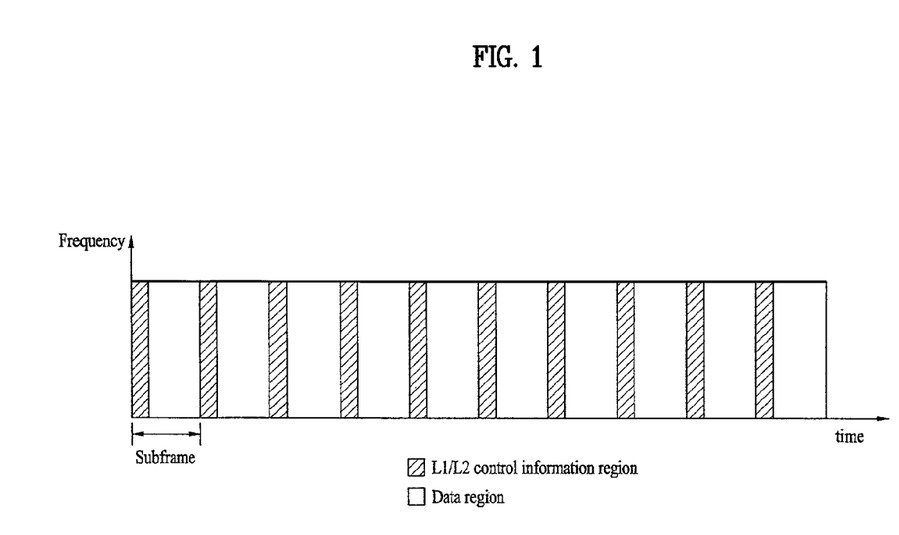
FIG. 1 is a diagram illustrating an example of a structure of a physical channel used in a multiple carrier system according to the related art.

FIG. 1 illustrates an example of a structure of a physical channel used in a multiple carrier system according to the related art. In FIG. 1, a sub-frame comprises an L1/L2. control information transmission region (hatching part) and a data transmission region (non-hatching part).

Referring to FIG. 1, a physical channel includes a plurality of sub-frames on the time axis and a plurality of sub-carriers on the frequency axis, wherein one sub-frame includes a plurality of symbols on the time axis. One sub-frame includes a plurality of resource blocks (RBs), each of which includes a plurality of symbols and a plurality of sub-carriers. Also, each sub-frame can use specific sub-carriers of specific symbols (for example, first symbols) for a physical downlink control channel (PDCCH), i.e., L1/L2. control channel. One sub-frame has a length of 0.5. ms, and transmission time interval (TTI) that is a unit time of data transmission has a length of 1. ms corresponding to two sub-frames.

In a mobile communication system, radio resources of one cell includes uplink radio resources and downlink radio resources. The base station serves to allocate and control downlink radio resources and uplink radio resources of a cell. In other words, the base station determines what user equipment uses what kinds of radio resources and when the corresponding user equipment uses the corresponding radio resources. For example, the base station can determine that frequencies 100. Mhz and 101. Mhz are allocated to a first user equipment for downlink data transmission for 0.2. seconds after 3.2. seconds. The base station notifies the first user equipment of the determined fact so that the first user equipment can receive downlink data. Likewise, the base station determines what user equipment transmits uplink data through an uplink using how many radio resources, and also determines when the corresponding user equipment transmits uplink data. Also, the base station notifies the corresponding user equipment of the determined fact so that the corresponding user equipment can transmit uplink data.

In the related art, a specific user equipment has continued to use specific radio resources while call connection is being maintained. However, such a structure is inefficient in a recent communication system, which provides many services based on IP packets. This is because that most of packet services do not generate packets continuously for call connection time. Namely, packets may be transmitted for a specific interval but no packets may be transmitted for another specific interval. It is not efficient that radio resources are continuously allocated to a specific user equipment for call connection in the above packet-based system. In order to solve this problem, a recent mobile communication system uses a method of dynamically allocating radio resources to the user equipment if the user equipment needs the radio resources or only if there are data to be transmitted to the user equipment.

In the system which uses OFDM or SC-FDMA system, a frequency band is divided into bands of a constant size and each band is allocated to several user equipments. In this case, the base station may not receive data transmitted to an uplink through each frequency band due to interference of data transmitted from another band. In order to avoid this, synchronization in transmission time between the respective user equipments is necessarily required. In other words, when the first user equipment and the second user equipment are scheduled to transmit uplink data for a specific time interval, the time when the data transmitted from the first user equipment arrive in the base station should be identical with the time when the data transmitted from the second user equipment arrive in the base station. At this time, if there is a little difference in timings when the data transmitted from the first and second user equipments arrive in the base station, the data transmitted from the first and second user equipments cannot be recovered in the base station successfully.

Accordingly, in the system which uses OFDM or SC-FDMA system, uplink synchronization of the respective user equipments is necessarily required. To maintain uplink synchronization, various methods are used. One of the various methods is a synchronization method based on a random access procedure through a random access channel (RACH).

The random access procedure will now be described in brief The user equipment, which is in a non-synchronization state, transmits a bit stream, which is previously determined, i.e., signature, to the base station. The base station detects the signature, and calculates how slow data transmission of the user equipment should be performed or how fast data transmission of the user equipment should be performed, so as to reach uplink synchronization based on the detected signal. The base station reports the calculated result to the user equipment. The user equipment adjusts the transmission time of uplink data based on the calculated result and then obtains uplink synchronization.

Hereinafter, radio resource control (RRC) state of the user equipment and its RRC connection method will be described. The RRC state means whether RRC layer of the user equipment is logically connected with RRC layer of the network. The RRC state is called RRC connected state if the RRC layer of the user equipment is logically connected with the RRC layer of the network. On the other hand, the RRC state is called RRC idle state if not so. The network can identify the presence of the user equipment of the RRC connected state in a cell unit due to the presence of the RRC connection. Accordingly, the network can effectively control the user equipment. By contrast, the network cannot identify the user equipment of the RRC idle state, and a core network manages the user equipment of the idle state in a unit of a tracking area which is a local unit greater than the cell. In other words, in case of the user equipment of the RRC idle state, its presence is identified in a great local unit. The user equipment should be shifted to the RRC connected state to obtain a typical mobile communication service such as voice or data.

When a user first turns on the power of the user equipment, the user equipment searches a proper cell and then stays in the corresponding cell in the RRC idle state. The user equipment, which stays in the RRC idle state, performs RRC connection with the RRC layer of the network through an RRC connection procedure if the RRC connection is required, and is shifted to the RRC connected state. The user equipment, which is in the RRC idle state, needs the RRC connection in case of various examples. For example, the user equipment which is in the RRC idle state needs the RRC connection if uplink data transmission is needed due to trying calling of the user or if a response message transmission to a paging message received from the network is needed.

DISCLOSURE OF THE INVENTION

The user equipment does not perform data transmission to an uplink even though the RRC connection is performed between the user equipment and the network. For example, when a user performs Internet browsing, the user does not take any action until it fully reads a desired web page downloaded from Internet. While the user does not take any action as above, the user equipment performs an unnecessary effort (for example, continuous random access procedure) for maintaining uplink synchronization, whereby radio resources or resources such as the power of the user equipment may be wasted.

Accordingly, the present invention is directed to a method of controlling uplink synchronization state at a user equipment in a mobile communication system, which substantially obviates one or more problems due to limitations and disadvantages of the related art.

An object of the present invention is to provide a method of controlling uplink synchronization state at a user equipment in a mobile communication system, in which the user equipment can efficiently control a synchronization state with a network in the mobile communication system.

Another object of the present invention is to provide a method of controlling uplink synchronization state at a user equipment in a mobile communication system, in which the user equipment can efficiently manage radio resources in accordance with shift of the synchronization state.

To achieve these objects and other advantages and in accordance with the purpose of the invention, as embodied and broadly described herein, a method of controlling an uplink synchronization state at a user equipment in a mobile communication system comprises receiving control information associated with controlling uplink synchronization state of the user equipment from a network, releasing uplink resources allocated from the network if the uplink synchronization state is shifted from a synchronization state to an asynchronous state based on the control information.

In another aspect of the present invention, a method of controlling an uplink synchronization state at a user equipment in a mobile communication system comprises receiving downlink data from a network, the downlink data including a dedicated random access preamble, and performing a random access procedure using the dedicated random access preamble regardless of that the user equipment is in the uplink synchronization state or asynchronous state.

In still another aspect of the present invention, a method of controlling an uplink synchronization state at a user equipment in a mobile communication system comprises being allocated with uplink or downlink channel resources from a network, and releasing the uplink or downlink channel resources if the user equipment is in an asynchronous state; and performing a random access procedure with the network.

In further still another aspect of the present invention, a method of controlling an uplink synchronization state at a user equipment in a mobile communication system comprises being allocated with uplink channel resources from a network, receiving timing alignment command from the network; driving a timing alignment timer, and releasing the allocated uplink channel resources if the timing alignment timer ends.

In further still another aspect of the present invention, a method of controlling an uplink synchronization state at a user equipment in a mobile communication system comprises receiving timing alignment command from a network, driving a timing alignment timer for determining the uplink synchronization state, and performing a random access procedure if uplink data to be transmitted to the network occur in a state that the timing alignment timer ends.

According to the embodiments of the present invention, the user equipment can efficiently control a synchronization state with the network in the mobile communication system, and can efficiently manage radio resources in accordance with the synchronization state.

BRIEF DESCRIPTION OF THE DRAWINGS

FIG. 4A and FIG. 4B are diagrams illustrating a structure of a radio interface protocol between a user equipment (UE)

and E-UTRAN, in which

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an E-UMTS (Evolved Universal Mobile Telecommunications System).

Figure 2:
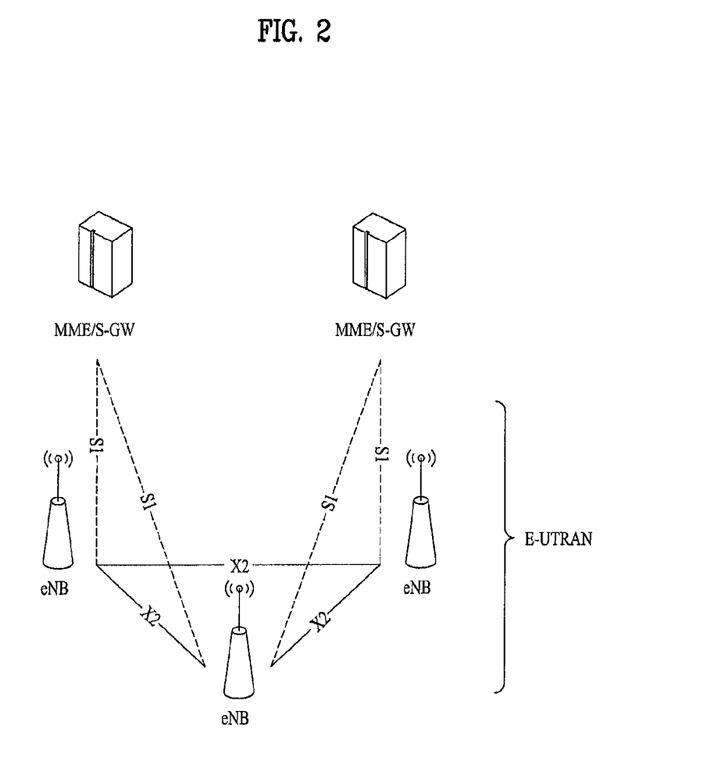
FIG. 2 is a diagram illustrating a network structure of an E-UMTS (Evolved Universal Mobile Telecommunications System)

FIG. 2 illustrates a network structure of an E-UMTS. An E-UMTS is a system evolving from the conventional WCDMA UMTS and its basic standardization is currently handled by the 3GPP (3rd. Generation Partnership Project). The E-UMTS can also be called an LTE (Long Term Evolution) system. [http://www.3gpp.org/ftp/Specs/2006-12/] and [http://www.3gpp.org/ftp/Specs/html-info/GanttChart-Level-2.htm] can be referred to, so as to obtain detailed information about technical specification of the UMTS and E-UMTS.

Referring to FIG. 2, an E-UTRAN includes base stations (hereinafter, referred to as 'eNode B' or 'eNB'), wherein respective eNBs are connected with each other through X2. interface. Also, each of eNBs is connected with a user equipment (UE) through a radio interface and connected with EPC (Evolved Packet Core) through S1 interface. The EPC includes a mobility management entity/system architecture evolution (MME/SAE) gateway.

Layers of a radio interface protocol between a user equipment and a network can be classified into a first layer L1, a second layer L2. and a third layer L3. based on three lower layers of OSI (open system interconnection) standard model widely known in communication systems. A physical layer belonging to the first layer L1. provides an information transfer service using a physical channel. A radio resource control (hereinafter, abbreviated as 'RRC') located at the third layer plays a role in controlling radio resources between the user equipment and the network. For this, the RRC layer enables RRC messages to be exchanged between the UE and the network. The RRC layer can be distributively located at network nodes including Node B, an AG and the like or can be independently located at either the Node B or the AG.

Figure 3:
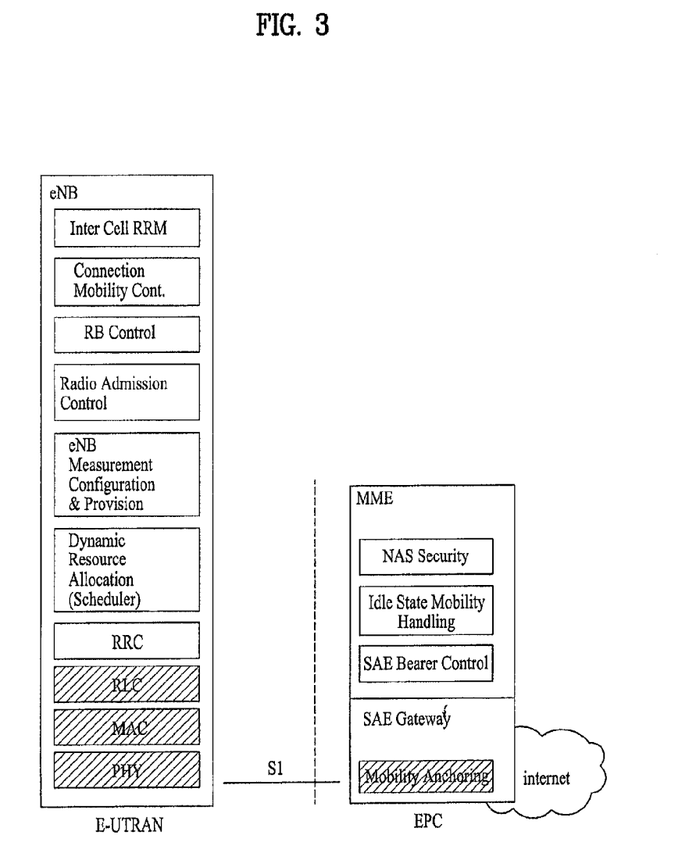
FIG. 3 is a schematic view illustrating an E-UTRAN (Evolved Universal Terrestrial Radio Access Network)

FIG. 3 is a schematic view illustrating an E-UTRAN (UMTS terrestrial radio access network). In FIG. 3, a hatching part represents functional entities of a user plane, and a non-hatching part represents functional entities of a control plane.

Figure 4A:
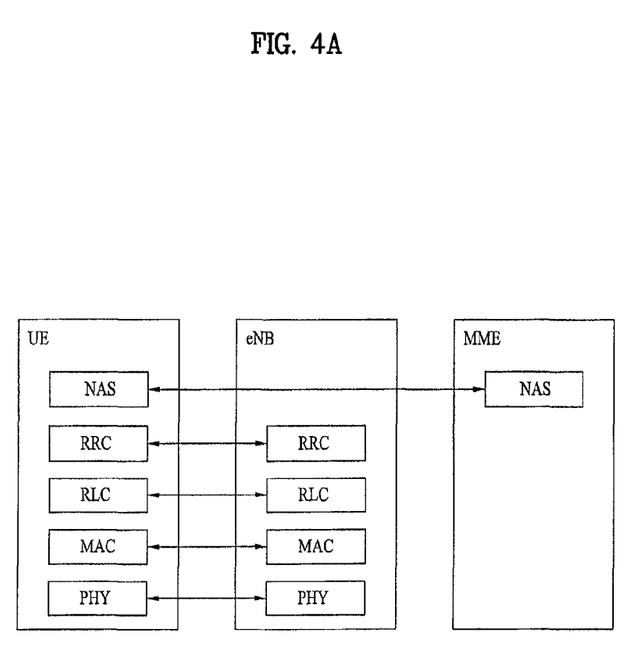
FIG. 4A is a schematic view of a control plane protocol and FIG. 4B is a schematic view of a user plane protocol.
Figure 4B:
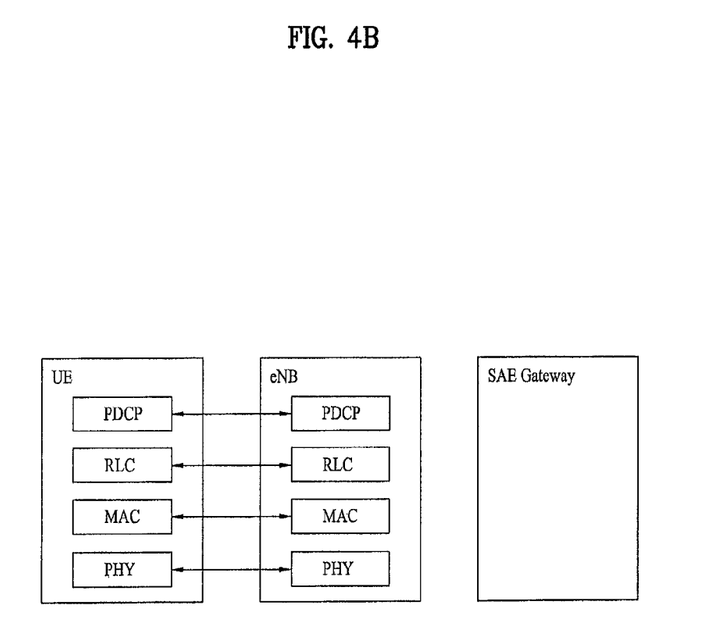

FIG. 4A and FIG. 4B illustrate a structure of a radio interface protocol between the user equipment (UE) and the E-UTRAN, in which FIG. 4A is a schematic view of a control plane protocol and FIG. 4B is a schematic view of a user plane protocol. Referring to FIG. 4A and FIG. 4B, a radio interface protocol horizontally includes a physical layer, a data link layer, and a network layer, and vertically includes a user plane for data information transfer and a control plane for signaling transfer. The protocol layers in FIG. 4A and FIG. 4B can be classified into L1. (first layer), L2. (second layer), and L3. (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated in accordance with an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit data using IP packets (e.g., IPv4. or IPv6) within a radio-communication period having a narrow bandwidth, a PDCP layer of the second layer (L2) performs header compression to reduce the size of unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the user equipment and the UTRAN.

As downlink transport channels carrying data from the network to the user equipments, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from the user equipments to the network, there are provided a random access channel (RACH) carrying an initial control message and an uplink shared channel (UL-SCH) carrying user traffic or control message.

As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

Figure 5:
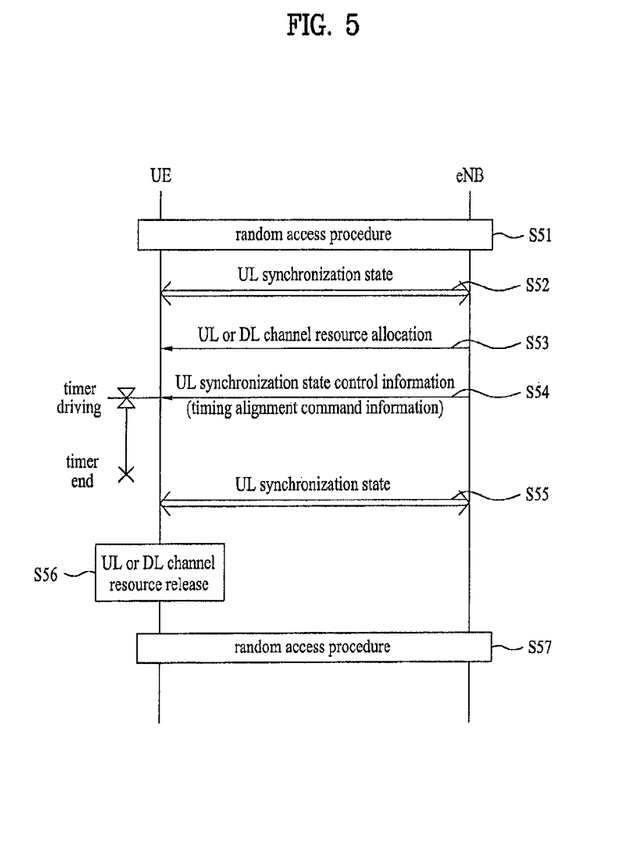
FIG. 5 is a flow chart illustrating a procedure according to one embodiment of the present invention.

FIG. 5 is a flow chart illustrating a procedure according to one embodiment of the present invention.

Referring to FIG. 5, the user equipment (UE) performs a random access procedure with the base station (eNB) through a random access channel (RACH) [S51]. Through the random access procedure, the user equipment adjusts uplink synchronization and enters the synchronization state [S52].

Figure 6:
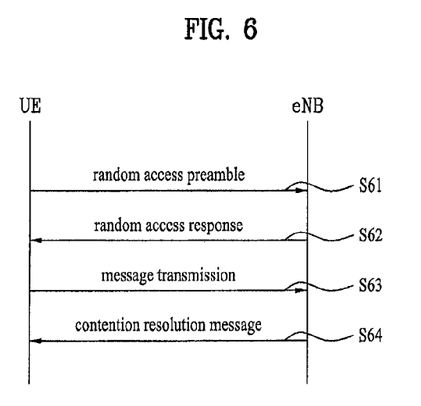
FIG. 6 is a flow chart illustrating a contention based random access procedure according to another embodiment of the present invention.

FIG. 6 is a flow chart illustrating a contention based random access procedure according to another embodiment of the present invention. Referring to FIG. 6, if the MAC layer of the user equipment commands its physical layer to initiate the random access procedure, the physical layer of the user equipment selects one access slot and one signature, transmits a random access preamble to the base station [S61]. If the user equipment transmits the preamble, the base station transmits a response message through a downlink physical channel (for example, AICH (Acquisition Indicator Channel)) [S62]. The AICH transmitted in response to the preamble transmits the signature selected by the preamble for a first constant length of an access slot corresponding to the access slot through which the preamble has been transmitted. At this time, the base station transmits ACK (acknowledgement) or NACK (non-acknowledgement) to the user equipment through the signature transmitted from the AICH. At this time, the user equipment transmits a specific message using radio resource allocation information, message size, and radio parameters, which are included in the random access response message [S63]. The random access response message includes timing alignment information, and the user equipment acquires uplink synchronization using the timing alignment information.

If the user equipment receives NACK through the random access response message, the MAC layer of the user equipment commands the physical layer of the user equipment to transmit the preamble again after a proper time. If the message is received from the user equipment, the base station transmits a MAC contention resolution message to the user equipment [S64].

In FIG. 6, since the random access procedure is based on contention, the user equipment cannot sure that the random access response message is transmitted to itself. Accordingly, the user equipment does not determine that it has acquired uplink synchronization until it clearly identifies successful random access by receiving the contention resolution message. In other words, if it is identified through the contention resolution message that the user equipment has failed in random access, the user equipment should determine that it has not acquired uplink synchronization.

Referring to FIG. 5 again, if the user equipment performs successful random access, the user equipment enters the uplink (UL) synchronization state [S52]. The base station allocates uplink and/or downlink channel resources through uplink (UL)/downlink (DL) scheduling procedure so that the user equipment transmits uplink data or receives downlink data [S53].

The base station transmits control information to the user equipment, wherein the control information is to control the uplink synchronization state of the user equipment [S54]. In the embodiment of FIG. 5, the control information includes time alignment command information. If the time alignment command information is received, the user equipment drives a timer for time alignment. If the timer is already being operated when the user equipment receives the time alignment command information, the user equipment drives the timer again.

If the timer ends without separate command related to the uplink synchronization state of the user equipment from the base station, the user equipment determines that it has been shifted to the uplink asynchronous state [S55]. Therefore, the user equipment releases all the uplink or downlink channel resources allocated from the base station [S56]. In other words, the user equipment regards that the uplink or downlink channel resources have not been allocated, and transmits uplink data through the uplink channel resources or does not try to receive downlink data through the downlink channel resources. Also, if the user equipment needs to acquire uplink synchronization to transmit uplink data or due to other reason, it performs the random access procedure [S57].

Figure 7:
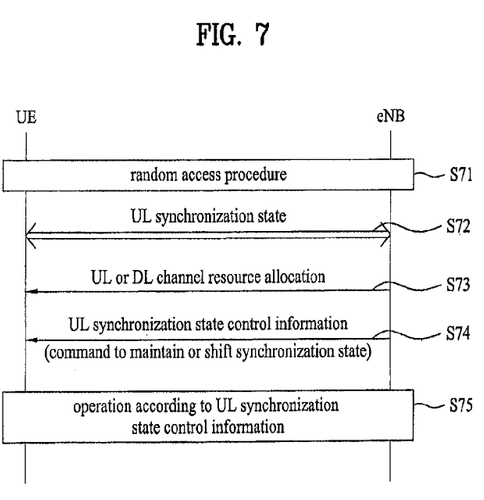
FIG. 7 is a flow chart illustrating a procedure according to another embodiment of the present invention.

FIG. 7 is a flow chart illustrating a procedure according to another embodiment of the present invention.

Referring to FIG. 7, the user equipment (UE) performs a random access procedure with the base station (eNB) through a random access channel (RACH) [S71]. Through the random access procedure, the user equipment adjusts uplink synchronization and enters the synchronization state [S72]. The base station allocates uplink and/or downlink channel resources through uplink (UL)/downlink (DL) scheduling procedure so that the user equipment transmits uplink data or receives downlink data [S73]. Details of the above steps S71 to S73 can be obtained with reference to the description according to the embodiment of FIG. 5.

The base station transmits control information to the user equipment, wherein the control information is to control the uplink synchronization state of the user equipment [S74]. In the embodiment of FIG. 7, the control information includes command information as to whether to continuously maintain the uplink synchronization state of the user equipment or whether to shift the uplink synchronization state of the user equipment to the uplink asynchronous state. The user equipment performs a specific operation through communication with the base station or performs its own operation in accordance with the control information of the uplink synchronization state received from the base station [S75]. The detailed operation performed by the user equipment depends on the control information, especially the command information, and will now be described in detail.

If the command information commands that the user equipment should maintain the uplink synchronization state, the user equipment performs the random access procedure periodically or non-periodically. At this time, the base station can notify the user equipment of the period related to performing the random access procedure. Alternatively, the user equipment can determine the period or can perform the random access procedure non-periodically.

If the user equipment performs the random access procedure periodically, it drives a timer for measuring the period when the random access procedure successfully ends. If the timer for measuring the period ends, the user equipment performs the random access procedure again. If the user equipment successfully transmits uplink data to the base station even before the timer ends, it drives the timer again. If the user equipment successfully performs the random access procedure or uplink data transmission, the user equipment regards that it is in the uplink synchronization state. On the other hand, if the user equipment fails in the random access or uplink data transmission, the user equipment regards that it is in the uplink asynchronous state.

For another example, if the command information commands that the user equipment should maintain the uplink synchronization state, the base station periodically allocates uplink radio resources to the user equipment so that the user equipment maintains the uplink synchronization state. The user equipment transmits data or control information to the base station using the allocated uplink radio resources. At this time, the user equipment can transmit an indicator together with the data or control information, wherein indicator indicates that transmission of the data or control information is to maintain uplink synchronization. The indicator can be transmitted with together with MAC PDU, for example, in addition to the data or control information. The base station can transmit allocation information for allocating the uplink radio resources to the user equipment through PDCCH on L1/L2. control channel. Alternatively, the base station can transmit allocation information for allocating the uplink radio resources to the user equipment together with RRC message. In this case, the allocation information is included in the RRC message.

Figure 8:
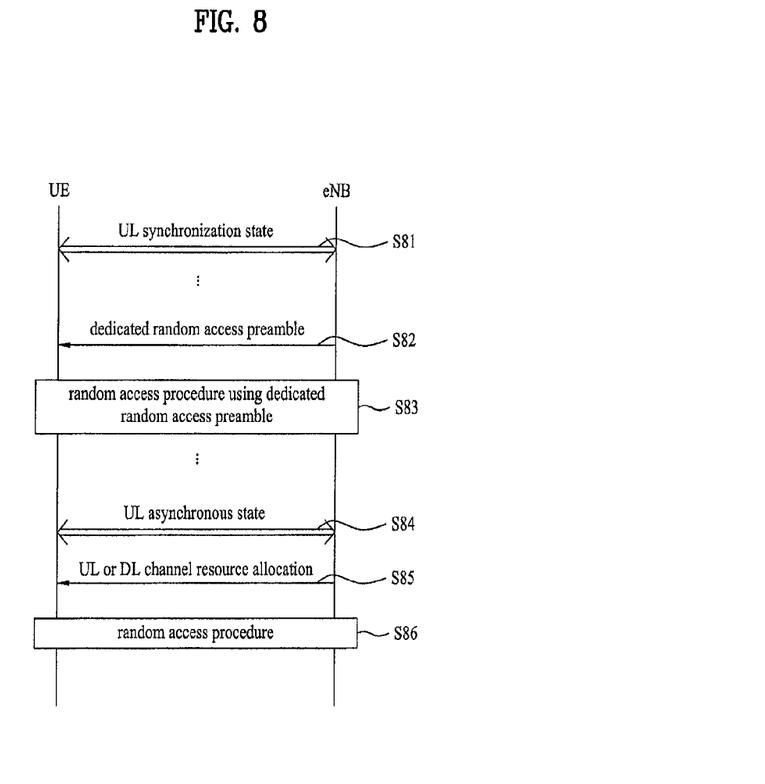
FIG. 8 is a flow chart illustrating a procedure according to other embodiment of the present invention.

FIG. 8 is a flow chart illustrating a procedure according to other embodiment of the present invention. The embodiment of FIG. 8 relates to the operation of the user equipment if the user equipment is not sure that it is in the uplink synchronization state or the uplink asynchronous state.

Referring to FIG. 8, the user equipment (UE) acquires uplink synchronization through the random access procedure with the base station (eNB) [S81]. The base station allocates a dedicated random access preamble to the user equipment [S82]. The dedicated random access preamble can be allocated to the user equipment by the base station even before the user equipment acquires the uplink synchronization. If a given time passes without separate procedure after the user equipment acquires the uplink synchronization state, the user equipment cannot identify whether it is in the uplink synchronization state or the uplink asynchronous state. In this case, the user equipment performs the random access procedure with the base station using the dedicated random access preamble regardless of that it is in the uplink synchronization state or the uplink asynchronous state, and then acquires the uplink synchronization [S83]. In other words, except that the dedicated random access preamble is allocated through RRC message for handover, the user equipment regards that it is in the uplink asynchronous state.

In FIG. 8, in a state that the user equipment is in the uplink asynchronous state [S84], the user equipment is allocated with uplink or downlink channel resources from the base station [S85]. In this case, the user equipment does not regard that it is in the uplink synchronization state, with only the fact that it has been allocated with the uplink or downlink channel resources. Accordingly, the user equipment does not perform data transmission through the allocated uplink channel resources, and does not transmit ACK/NACK in response to the allocated downlink channel resources, either. Also, the user equipment performs the random access procedure with the base station. In this case, the user equipment notifies the base station that error related to the uplink synchronization has occurred. In other words, the user equipment notifies the base station that it has been allocated with uplink or downlink radio resources in a state that it is in the uplink asynchronous state.

According to another embodiment of the present invention, the user equipment can manage the uplink synchronization state in accordance with a given state. Hereinafter, detailed examples of managing the uplink synchronization state will be described.

According to the first example, if a predetermined condition which is previously set is satisfied, the user equipment periodically performs the random access procedure or transmits data through the uplink to maintain the uplink synchronization state. The predetermined condition relates to whether signal quality of a cell where the user equipment is located is greater than or less than a given level. Alternatively, the predetermined condition relates to whether signal quality of a peripheral cell of the cell where the user equipment is located is greater than or less than a given level.

According to the second example, if the uplink channel resources are allocated to the user equipment, the user equipment regards that the base station has commanded the user equipment to maintain the uplink synchronization state, and periodically performs the random access procedure or transmits data to the base station through the uplink. In other words, if the dedicated uplink channel resources are allocated to the user equipment, the user equipment performs the operation for maintaining the uplink synchronization state. Also, if the base station releases the dedicated radio resources allocated to the user equipment, the user equipment regards that the base station has commanded the user equipment to shift the current state to the uplink asynchronous state. In this case, the user equipment does not perform the operation for maintaining the uplink synchronization state.

If the user equipment is shifted to the uplink asynchronous state in a state that the uplink radio resources are allocated to the user equipment, the user equipment releases its dedicated uplink radio resources. In other words, the user equipment does not regard that the uplink radio resources are allocated to the user equipment, and does not perform data transmission using the uplink radio resources. The user equipment transmits uplink data using its dedicated uplink radio resources only if it is in the uplink synchronization state. For example, the dedicated uplink radio resources are to transmit sounding reference signal (SRS) or CQI. For another example, the uplink radio resources could be radio resources for transmitting ACK/NACK to persistently scheduled resources set to transmit data through the uplink or another persistently scheduled resources set to receive data transmitted through the downlink. For other example, the uplink radio resources mean dedicated scheduling request channels used to allow the user equipment to request the base station of radio resources.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used in a wireless communication system such as a mobile communication system or a wireless Internet system.

What is claimed:

1. A method of controlling an uplink synchronization state of a user equipment in a mobile communication system by performing random access procedures, the method comprising:
   receiving, by the user equipment, a random access response including a time alignment command from a network during a first random access procedure;
   starting, by the user equipment, a time alignment timer for uplink time alignment when the time alignment command is received from the network;
   receiving, by the user equipment, a contention resolution message from the network to determine whether the first random access procedure is successful or not, wherein the user equipment considers itself in an asynchronous state and stops the time alignment timer when the user equipment determines that the first random access procedure is not successful based on the contention resolution message; and
   performing, by the user equipment, a second random access procedure when the user equipment obtains uplink data to be transmitted to the network after the time alignment timer has expired.

2. The method of claim 1, wherein the user equipment considers itself as in a synchronous state if the user equipment determines that the first random access procedure is successful based on the contention resolution message.

3. The method of claim 1, further comprising periodically performing a random access procedure with the network.

4. The method of claim 1, further comprising:
   receiving a message allocating uplink radio resources from the network; and
   transmitting uplink data to the network through the allocated uplink radio resources.

5. The method of claim 4, wherein the uplink data includes information indicating that the data transmission is to maintain the uplink synchronization state.

6. The method of claim 1, wherein the user equipment releases uplink or downlink channel resources allocated by the network.

7. A user equipment (UE) for controlling an uplink synchronization state by performing random access procedures in a mobile communication system, the user equipment configured to:
   receive a random access response including a time alignment command from a network during a first random access procedure;
   start a time alignment timer for uplink time alignment when the time alignment command is received from the network; and
   receive a contention resolution message from the network to determine whether the first random access procedure is successful or not, wherein the user equipment considers itself as in an asynchronous state and stops the time alignment timer when the user equipment determines that the first random access procedure is not successful based on the contention resolution message; and
   perform a second random access procedure when the user equipment obtains uplink data to be transmitted to the network after the time alignment timer has expired.

8. The user equipment of claim 7, wherein the user equipment considers itself as in a synchronous state if the user equipment determines that the first random access procedure is successful based on the contention resolution message.

9. The user equipment of claim 7, wherein the user equipment is further configured to:
   receive a message allocating uplink radio resources from the network; and
   transmit uplink data to the network through the allocated uplink radio resources.

10. The user equipment of claim 9, wherein the uplink data includes information indicating that the data transmission is to maintain the uplink synchronization state.

11. The user equipment of claim 7, wherein the user equipment releases uplink or downlink channel resources allocated by the network.

* * * * *